(12) United States Patent
Kim et al.

(10) Patent No.: US 8,331,449 B2
(45) Date of Patent: Dec. 11, 2012

(54) FAST ENCODING METHOD AND SYSTEM USING ADAPTIVE INTRA PREDICTION

(75) Inventors: Eung Tae Kim, Gyeonggi-do (KR); Ki-Young Jang, Incheon (KR)

(73) Assignee: Korea Polytechnic University Industry Academic Cooperation Foundation, Gyeonggi-do (KR)

( * ) Notice: Subject to any disclaimer, the term of this patent is extended or adjusted under 35 U.S.C. 154(b) by 1046 days.

(21) Appl. No.: 12/262,006

(22) Filed: Oct. 30, 2008

(65) Prior Publication Data

US 2009/0296812 A1    Dec. 3, 2009

(30) Foreign Application Priority Data

May 28, 2008    (KR) .................. 10-2008-0049706

(51) Int. Cl.
*H04N 7/12* (2006.01)
*H04N 11/02* (2006.01)
*H04N 11/04* (2006.01)

(52) U.S. Cl. .................. 375/240.13; 375/240.16
(58) Field of Classification Search ............. 375/240.13, 375/240.16
See application file for complete search history.

(56) References Cited

U.S. PATENT DOCUMENTS

| | | | |
|---|---|---|---|
| 5,737,537 A * | 4/1998 | Gardos et al. ................ | 709/247 |
| 5,751,378 A * | 5/1998 | Chen et al. ................... | 348/700 |
| 5,825,425 A * | 10/1998 | Kazui et al. ............... | 375/240.24 |
| 6,259,736 B1 * | 7/2001 | Chujoh et al. ............ | 375/240.13 |
| 6,611,561 B1 * | 8/2003 | Hannuksela et al. .... | 375/240.27 |
| 6,782,052 B2 * | 8/2004 | Sun et al. ................. | 375/240.12 |
| 6,885,704 B1 * | 4/2005 | Imura ....................... | 375/240.12 |
| 6,895,048 B2 * | 5/2005 | Boice et al. .............. | 375/240.02 |
| 7,031,387 B2 * | 4/2006 | Jeon ......................... | 375/240.15 |
| 7,116,714 B2 * | 10/2006 | Hannuksela ............. | 375/240.12 |
| 7,177,359 B2 * | 2/2007 | Song et al. ............... | 375/240.16 |
| 7,236,524 B2 * | 6/2007 | Sun et al. ................. | 375/240.12 |
| 7,277,487 B2 * | 10/2007 | Assaf ....................... | 375/240.16 |
| 7,289,672 B2 * | 10/2007 | Sun et al. ...................... | 382/236 |
| 7,386,048 B2 * | 6/2008 | Sun et al. ................. | 375/240.15 |
| 7,489,728 B2 * | 2/2009 | Fukuda .................... | 375/240.12 |
| 7,532,764 B2 * | 5/2009 | Lee et al. ..................... | 382/238 |
| 7,706,442 B2 * | 4/2010 | Kuo ......................... | 375/240.12 |
| 7,843,995 B2 * | 11/2010 | Bhaskaran et al. ...... | 375/240.13 |
| 7,929,608 B2 * | 4/2011 | Krishnan ................. | 375/240.13 |
| 7,936,820 B2 * | 5/2011 | Watanabe et al. ........ | 375/240.16 |

(Continued)

OTHER PUBLICATIONS

Bojun Meng & Oscar C. Au. Fast Intra-Prediction Mode Selection for 4×4 Blocks in H.264. 2003. IEEE. p. 389-392.*

*Primary Examiner* — Christian LaForgia
(74) *Attorney, Agent, or Firm* — Kinney & Lange, P.A.

(57) ABSTRACT

Fast encoding method and system are provided which can transmit video data in real time using adaptive intra prediction in accordance with the H.264/AVC (Advanced Video Codec) standard so as to efficiently provide security-related images or multimedia images in various network environments with high quality. An intra prediction method of compressing and encoding an image includes the steps of: comparing an SAD value C calculated from macro block data of a present frame and a previous frame with a reference value K to determine a prediction method; and selectively performing on input macro block data a first method of determining a best mode and a block size by prediction in a plurality of prediction modes based on spatial directivity and generating prediction data and a second method of generating prediction data using the best mode and the block size used in the previous frame, depending on the determined prediction method.

8 Claims, 6 Drawing Sheets

U.S. PATENT DOCUMENTS

| | | | | |
|---|---|---|---|---|
| 8,054,887 B2* | 11/2011 | Keesen | ................... | 375/240.24 |
| 8,059,717 B2* | 11/2011 | Saigo et al. | ............. | 375/240.12 |
| 2002/0118754 A1* | 8/2002 | Choi | ....................... | 375/240.14 |
| 2003/0223495 A1* | 12/2003 | Sun et al. | ................ | 375/240.12 |
| 2004/0028282 A1* | 2/2004 | Kato et al. | .................... | 382/236 |
| 2004/0233989 A1* | 11/2004 | Kobayashi et al. | ...... | 375/240.16 |
| 2004/0264571 A1* | 12/2004 | Zhang et al. | ............. | 375/240.16 |
| 2005/0089094 A1* | 4/2005 | Yoo et al. | ................ | 375/240.12 |
| 2005/0089099 A1* | 4/2005 | Lee | .......................... | 375/240.16 |
| 2005/0201627 A1* | 9/2005 | Liang et al. | ................... | 382/239 |
| 2006/0126730 A1* | 6/2006 | Arakawa et al. | ......... | 375/240.03 |
| 2006/0176962 A1* | 8/2006 | Arimura et al. | ......... | 375/240.24 |
| 2006/0182174 A1* | 8/2006 | Kuo | ........................ | 375/240.03 |
| 2006/0193386 A1* | 8/2006 | Lin et al. | ................. | 375/240.16 |
| 2006/0239349 A1* | 10/2006 | Shibayama | .............. | 375/240.12 |
| 2006/0280248 A1* | 12/2006 | Kim et al. | ................ | 375/240.16 |
| 2007/0002945 A1* | 1/2007 | Kim | .............................. | 375/240 |
| 2007/0098070 A1* | 5/2007 | Saigo et al. | ............. | 375/240.12 |
| 2007/0153896 A1* | 7/2007 | Song et al. | .............. | 375/240.13 |
| 2007/0206681 A1* | 9/2007 | Xin et al. | ................. | 375/240.24 |
| 2007/0253484 A1* | 11/2007 | Zhao et al. | .............. | 375/240.13 |
| 2007/0274380 A1* | 11/2007 | Tikiya et al. | .................. | 375/240 |
| 2007/0280353 A1* | 12/2007 | Arakawa et al. | ......... | 375/240.12 |
| 2008/0025397 A1* | 1/2008 | Zhao et al. | .............. | 375/240.13 |
| 2008/0205515 A1* | 8/2008 | Kalva et al. | ............. | 375/240.02 |
| 2009/0034617 A1* | 2/2009 | Tanaka | ..................... | 375/240.13 |
| 2010/0309977 A1* | 12/2010 | Andersson et al. | ...... | 375/240.12 |

* cited by examiner

FAST ENCODING METHOD AND SYSTEM USING ADAPTIVE INTRA PREDICTION

BACKGROUND OF THE INVENTION

1. Field of the Invention

The present invention relates to an encoding method and system, and more particularly, to fast encoding method and system that can transmit video data in real time using adaptive intra prediction in accordance with the H.264/AVC (Advanced Video Codec) standard so as to efficiently provide security-related images or multimedia images in various network environments with high quality.

2. Description of the Related Art

The requirement for high-performance video compression techniques for efficiently providing a multimedia service in various network environments has increased. In the field of security, much attention has been paid to real-time transmission of high-quality images in networks with consumers' requirements.

The VCEG (Video Coding Experts Group) of the ITU-T and the MPEG (Moving Picture Expert Group) of the ISO/IEC established the MPEG-4 Part 10/H.264 standard for improving the network adaptiveness and the error resilience to provide high-quality images. In the present field of security, the replacement with the H.264/AVC compression scheme providing compression performance 30 to 40 times higher than that of the MPEG-4 scheme or the MJPEG scheme which is the primary compression scheme of DVRs or IP (Internet Protocol) cameras has been strongly requested for. Accordingly, in view of flexibility for easy adaptation to various network environments and encoding efficiency of moving images, studies for replacement with the H.264/AVC which is the next-generation moving image compression standard much advanced from the existing standards have been actively made.

According to the H.264/AVC, it is possible to accomplish video compression with high quality at a bit rate lower than that of the existing encoding schemes such as the MPEG-2 and the H.263. This is because of the use of intra/inter prediction schemes which is more various and complex than the existing schemes. As a result, the compression efficiency has been improved but more calculation and access to memory than those of the existing schemes have been required. Therefore, there is a need for studies for improving encoding performance by reducing the complexity of the encoder while maintaining the quality of images in the applications requiring the real-time transmission. Particularly, the encoding scheme using H.264 intra prediction is a technique as a spatial prediction scheme suggested for removing the spatial overlap using pixels of the peripheral blocks around pixels in the present block in the same image. This scheme minimizes error signals as an actual encoding target to improve the compression performance by using plural prediction modes with spatial directivity. The SAD (Sum of Absolute Differences) or the SATD (Sum of Absolute Transform Difference) between various predicted blocks and the original block is calculated and then a mode having the smallest value is selected as the optimal prediction mode. That is, in this scheme, since thirteen modes in total of nine modes for 4×4 brightness blocks and four modes for 16×16 brightness blocks are entirely retrieved at the time of determining the macro block prediction mode and then the mode having the minimum prediction error is selected, the calculation quantity is made to greatly increase and thus the processing time is also made to increase.

Various methods for reducing the calculation quantity of the H.264 intra encoding prediction scheme have been developed. The developed fast intra prediction mode determining methods include an edge map method of selecting one mode from various modes based on an edge direction, an EIP (Efficient Intra Prediction) method of detecting a specific condition and determining a mode satisfying the detected specific condition, a Pan algorithm of normalizing similar edge values between brightness components and chrominance components and determining a mode, a 4×4 mode determining method using the block size determination skip and the directivity, and a method using a Sober filter and a histogram in the edge direction. However, in such methods, the calculation quality is reduced in comparison with the existing entire mode retrieval method, but additional calculations for determining a new mode is required. Accordingly, in a multi-channel image security system, there is a need for more reducing the complexity and the calculation quantity for real-time operation.

SUMMARY OF THE INVENTION

The invention is contrived to solve the above-mentioned problems. An object of the invention is to provide fast encoding method and system using adaptive intra prediction in accordance with the H.264/AVC standard to transmit video data such as security-related images or multimedia images in various network environments in real time while reducing the complexity.

Another object of the invention is to provide adaptive intra prediction method and device for reducing processing time of the time-consuming intra prediction procedure and particularly reducing more processing time for a continuous image having a small variation by determining a prediction mode of the present frame in a continuous image having a small variation in background and environment, such as security images, using the temporal correlation that the present frame and the previous frame easily have the same macro block size and the same prediction mode, and fast encoding method and system employing the same.

According to an aspect of the invention, there is provided an intra prediction method of compressing and encoding an image, the method including the steps of: comparing an SAD value C calculated from macro block data of a present frame and a previous frame with a reference value K and determining a prediction method; and selectively performing on input macro block data a first method of determining a best mode and a block size by prediction in a plurality of prediction modes based on spatial directivity and generating prediction data and a second method of generating prediction data using the best mode and the block size used in the previous frame, depending on the determined prediction method.

The step of determining the prediction method may include: determining a variation in temporal correlation between an image of the present frame and an image of the previous frame on the basis of the comparison result; and selecting one of the first method of spatially predicting an image having a small correlation and the second method of predicting an image having a greater correlation than that of the first method by the use of the best mode and the block size used in the previous frame.

The step of determining the prediction method may include: calculating an average value SAD_avg of the SAD values calculated from the previous frame and a pre-previous frame; and comparing the average value with a threshold value K_1 adaptively determined in advance and adjusting the reference value K in accordance with the comparison result. The step of calculating the average value may use 16×16 block data as the macro block data.

The step of adjusting the reference value may include: raising the reference value by determining that the image has a small variation between the previous frame and the present frame when the average value is equal to or less than the threshold value; and lowering the reference value by determining that the image has a great variation between the previous frame and the present frame when the average value is greater than the threshold value.

The first method may include: selecting a minimum value MIN1 of the SAD values resulting from the spatial prediction on 4×4 block data in nine directivity prediction modes and a minimum value MIN2 of the SAD values resulting from the spatial prediction on 16×16 block data in four directivity prediction modes; selecting the smaller value of the minimum value MIN1 and the minimum value MIN2 and determining the mode to which the selected minimum value belongs as the best mode; and storing the best mode and the block size of the best mode in a predetermined storage and outputting prediction data predicted in the best mode.

The second method may include: when the best mode and the block size used in the previous frame are one of the nine directional prediction modes and the corresponding block size for the 4×4 block data, respectively, making a prediction on data having the corresponding block size in the corresponding mode; and when the best mode and the block size used in the previous frame are one of the four directional prediction modes and the corresponding block size for the 16×16 block data, respectively, making a prediction on data having the corresponding block size in the corresponding mode.

According to another aspect of the invention, there is provided an encoding method of compressing and encoding an image, the encoding method including the steps of: performing a DCT (Discrete Cosine Transform) on difference values at like positions in macro block data of input image data and prediction data; quantizing the DCT result; entropy-encoding the quantization result; and making an intra prediction on macro block data obtained by performing inverse quantization and inverse DCT on the quantization result and generating the prediction data. Here, the step of generating the prediction data includes: determining a variation in temporal correlation between an image of the present frame and an image of the previous frame; and generating the prediction data by selectively performing on input macro block data a first method of determining a best mode and a block size by prediction in a plurality of prediction modes based on spatial directivity and generating prediction data and a second method of generating prediction data using the best mode and the block size used in the previous frame, depending on the determined result.

According to another aspect of the invention, there is provided an intra prediction device for compressing and encoding an image, the intra prediction device including: a reference value comparison unit determining a prediction method by comparing an SAD value C calculated from macro block data of a present frame and a previous frame with a reference value K; a first prediction unit determining a best mode and a block size by making a prediction on input macro block data in a plurality of prediction modes based on spatial directivity and generating prediction data when a first method is determined as the prediction method; a buffer storing the best mode and the block size; and a second prediction unit generating prediction data for the input macro block using the best mode and the block size used in the previous frame and stored in the buffer when a second method is determined as the prediction method.

The first prediction unit may select a minimum value MIN1 of the SAD values resulting from the spatial prediction on 4×4 block data in nine directivity prediction modes and a minimum value MIN2 of the SAD values resulting from the spatial prediction on 16×16 block data in four directivity prediction modes, may select the smaller value of the minimum value MIN1 and the minimum value MIN2 and determines the mode to which the selected value belongs as the best mode, and may store the best mode and the block size of the best mode in the buffer and outputs prediction data predicted in the best mode.

The second prediction unit may include: a selector selecting a prediction path on the basis of the best mode and the block size stored in the buffer; a first predictor making a prediction on data having the corresponding block size in the corresponding mode using one of the nine directional prediction modes and the corresponding block size for the 4×4 block data as the best mode and the block size used in the previous frame, respectively, when a first path is selected as the prediction path; and a second predictor making a prediction on data having the corresponding block size in the corresponding mode using one of the four directional prediction modes and the corresponding block size for the 16×16 block data as the best mode and the block size used in the previous frame, respectively, when a second path is selected as the prediction path.

The reference value comparison unit may include: a first calculator calculating SAD values from macro block data of the present frame and the previous frame; a second calculator calculating an average value SAD_avg of SAD values acquired from the previous frame and a pre-previous frame; a comparator comparing the average value with a threshold value K_1 adaptively determined in advance; a first adjuster raising the reference value K on the basis of the average value and a first adjusting value when the comparison result is in a first logical state; a second adjuster lowering the reference value K on the basis of the average value and a second adjusting value when the comparison result is in a second logical state; and a determiner determining one of the first method and the second method on the basis of the comparison result of the SAD values C and the reference value K.

According to another aspect of the invention, there is provided an encoding system for compressing and encoding an image, the encoding system including: a DCT (Discrete Cosine Transform) unit performing a DCT on difference values at like positions in macro block data of input image data and prediction data; a quantization unit quantizing the DCT result; an encoding unit entropy-encoding the quantization result; and an intra prediction unit making an intra prediction on macro block data obtained by performing inverse quantization and inverse DCT on the quantization result to generate the prediction data. Here, the intra prediction unit includes: a reference value comparison unit determining a variation in temporal correlation between an image of a present frame and an image of a previous frame and determining a prediction method; a first prediction unit determining a best mode and a block size by prediction in a plurality of prediction modes based on spatial directivity and generating the prediction data for input macro block data when a first method is determined as the prediction method; and a second prediction unit generating the prediction data using the best mode and the block size used in the previous frame for the input macro block data when a second method is determined as the prediction method.

According to the above-mentioned fast encoding method and system using adaptive intra prediction, it is possible to considerably reduce the calculation quantity without any decrease in image quality and to accomplish the improvement of the real-time compression technique, by applying the macro block size and the best mode of the previous frame to a frame having a small variation in image using the temporal correlation as well as the spatial prediction method to reduce the complexity and the calculation quantity in the intra prediction.

The above-mentioned fast encoding method and system using adaptive intra prediction are more excellent in image quality, processing time, and bit rate than the known intra-prediction fast algorithm and are suitable for images such as security images having a small variation in background and environments.

The above-mentioned fast encoding method and system using adaptive intra prediction can be applied to the H.264/AVC which is the newest compression scheme to improve the performance and to reduce the complexity. Accordingly, it is possible to greatly contribute to the multimedia image processing in security systems and various network environments.

DETAILED DESCRIPTION OF THE INVENTION

Figure 1:
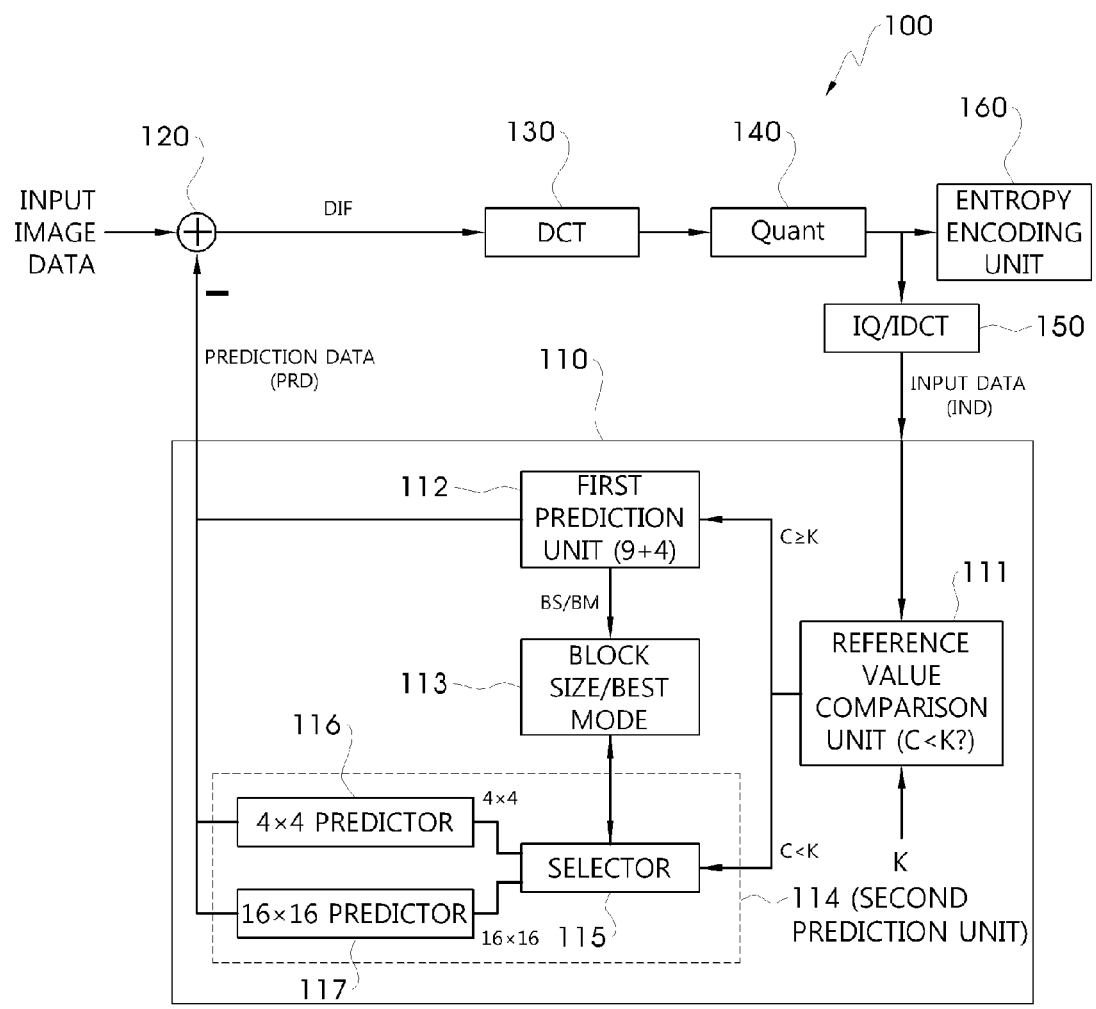
FIG. 1 is a diagram illustrating a fast encoding system using adaptive intra prediction according to an embodiment of the invention.

Hereinafter, exemplary embodiments of the invention will be described in detail with reference to the accompanying drawings, but the invention is not limited to the exemplary embodiments. In the drawings, like elements are referenced by like reference numerals.

FIG. 1 is a diagram illustrating a fast encoding system 100 using adaptive intra prediction according to an embodiment of the invention.

Referring to FIG. 1, the fast encoding system 100 according to the embodiment of the invention includes an intra prediction device 110 making an adaptive intra prediction, a subtracter 120, a DCT (Discrete Cosine Transform) unit 130, a quantization unit 140, an inverse quantization and inverse DCT unit 150, and an entropy encoding unit 160.

In the fast encoding system 100 for compressing and encoding an image according to the embodiment of the invention, the intra prediction device 110 can make an adaptive intra prediction on security-related images or multimedia images in various network environments in accordance with the H.264/AVC (Advanced Video Codec) and can be used to efficiently transmit high-quality video images in real time in the video applications for processing multimedia images in security systems or various network environments.

The intra prediction device 110 generates prediction data PRD by making an intra prediction on input macro block data IND fed back through the inverse quantization and inverse DCT unit 150 by the use of two paths based on the temporal correlation of images. The subtracter 120 generates difference values DIF at like positions in macro block data of input image data and the prediction data PRD. The input image data is video data of a still image or a moving image to be compressed. The macro block data is data obtained by dividing image data of plural pixels of a screen into 4×4 or 16×16 pixel blocks at the time of compressing the video data on the basis of the H.264/AVC standard and the like.

The DCT unit 130 performs a DCT on the difference values DIF at like positions in the macro block data of the input image data and the prediction data generated from the subtracter 120. The DCT is a process of calculating the sum of cosine functions of the difference values DIF.

The quantization unit 140 quantizes the DCT result of the DCT unit 130. The quantization is a process of removing unnecessary components to such an extent that the original data is not greatly changed. The DCT result can be quantized into 64 values and the like corresponding to predetermined table values.

The entropy encoding unit 160 entropy-encodes the quantization result output from the quantization unit 140. A CAVLC (Context-based Adaptive Variable Length Coding) or UVLC (Universal VLC) scheme as a variable length encoding scheme based on the Huffman coding or a CABAC (Context-based Adaptive Binary Arithmetic Coding) scheme as an arithmetic encoding scheme can be used for the entropy encoding.

The inverse quantization and inverse DCT unit 150 performs inverse quantization and inverse DCT on the quantization result of the quantization unit 140. The result of the inverse quantization and inverse DCT unit 150 is input as the input macro block data IND to the intra prediction device 110. The intra prediction device 110 generates the prediction data PRD and feeds back the prediction data to the subtracter 120.

As shown in FIG. 1, the intra prediction device 110 includes a reference value comparison unit 111, a first prediction unit 112, a buffer 113, and a second prediction unit 114. Here, the second prediction unit 113 includes a selector 115, a first predictor 116, and a second predictor 117.

The intra prediction device 110 determines a variation in temporal correlation between an image of a present frame and an image of a previous frame in the input macro block data IND, and selectively performs a prediction in two methods on the input macro block data IND on the basis of the determination result. That is, at the time of performing a first method similar to the known method, the intra prediction device 110 determines a best mode BM and a block size BS by prediction in plural prediction modes (for example, nine modes for 4×4 blocks and four modes for 16×16 blocks) based on the spatial directivity and outputs the corresponding prediction data PRD. Alternatively, at the time of performing a second method, the intra prediction device 110 generates and outputs the prediction data PRD by applying the best mode BM and the block size BS used in the previous frame on the input macro block data IND.

Figure 2:
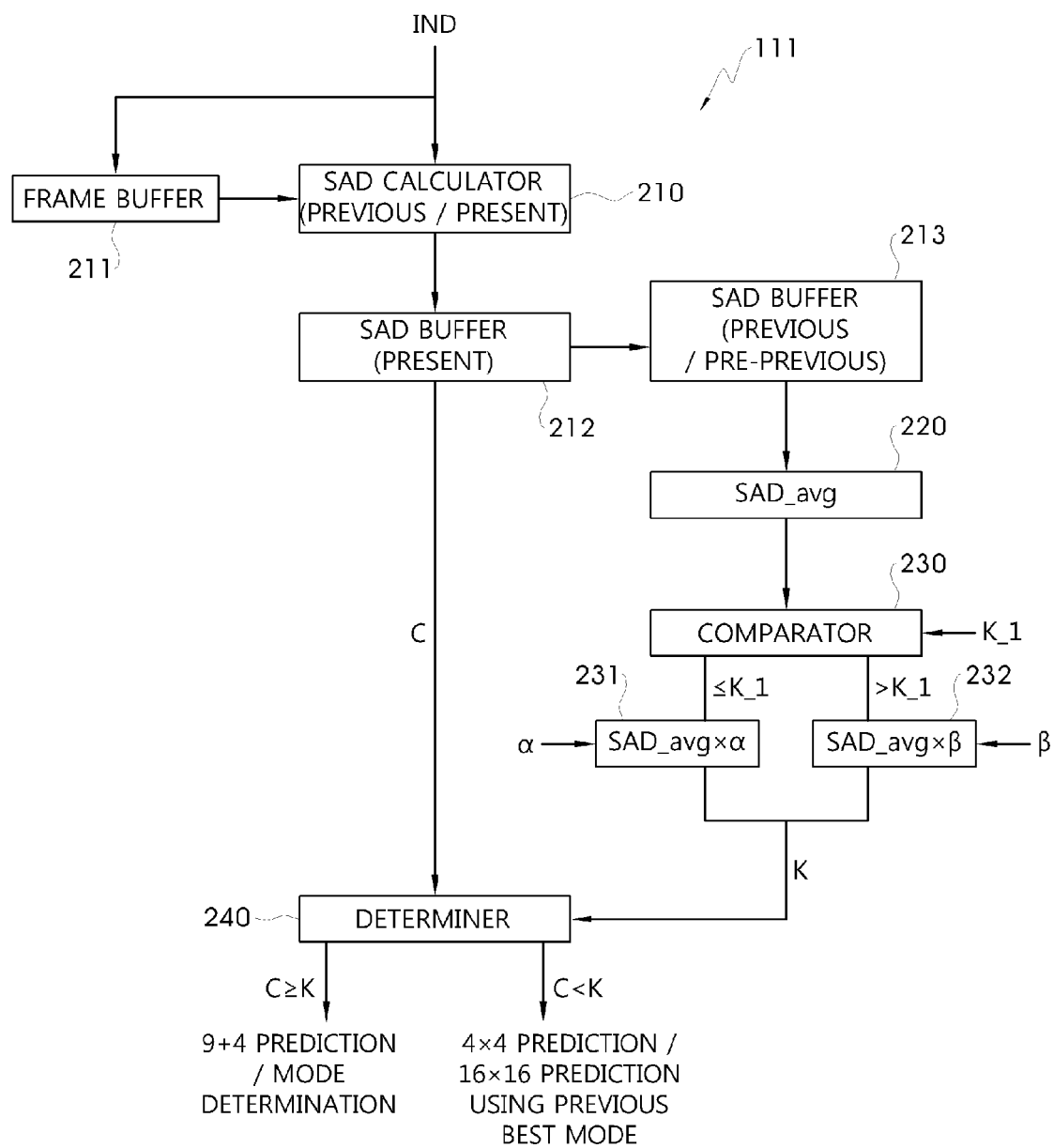
FIG. 2 is a block diagram illustrating a reference value comparator of an intra prediction unit shown in FIG. 1.

At this time, the reference value comparison unit 111 determines the variation in temporal correlation between the image of the present frame and the image of the previous frame and determines one of the above-mentioned two prediction methods. For example, as shown in FIG. 2, the reference value comparison unit 111 determines one of two prediction methods by comparing a reference value K with an SAD value C calculated from the macro block data of the present frame and the previous frame.

When the reference value comparison unit 111 determines the first method, the first prediction unit 112 determines the best mode BM and the block size BS by prediction in plural prediction modes (for example, nine modes for 4×4 blocks and four modes for 16×16 blocks) based on the spatial directivity on the input macro block data IND and generates the prediction data PRD.

The buffer 113 updates and stores the values of the best mode BM and the block size (BS) determined by the first prediction unit 112.

When the reference value comparison unit 111 determines the second method, the second prediction unit 113 generates the prediction data PRD by applying the best mode BM and the block size stored in the buffer, that is, the best mode and the block size used in the previous frame, for the input macro block data IND. The selector 115 specifies an operation path of the first prediction unit 116 or the second prediction unit 117 on the basis of the best mode BM and the block size BS last stored in the buffer 113. For example, when the best mode BM and the block size BS last stored in the buffer 113 are one of the nine modes for 4×4 blocks and the corresponding block size (4×4), respectively, the first predictor 116 generates the prediction data PRD using 4×4 block data. Alternatively, when the best mode BM and the block size BS finally stored in the buffer 113 are one of the four modes for 16×16 blocks and the corresponding block size (16×16), respectively, the second predictor 117 generates the prediction data PRD using 16×16 block data.

In this way, the reference value comparison unit 111 can determine the variation in temporal correlation between the image of the present frame and the image of the previous frame by comparing the reference value K with the SAD value calculated from the input macro block data IND. On the basis of the determination result of the reference value comparison unit 111, the first method of making a spatial prediction on the image having a small temporal correlation is performed by the first prediction unit 112, or the second method of applying the best mode BM and the block size BS used in the previous frame to the image having a temporal correlation greater than that of the first method instead of the spatial prediction to reduce the complexity and the calculation quantity in the intra prediction is performed by the second prediction unit 114.

Figure 3:
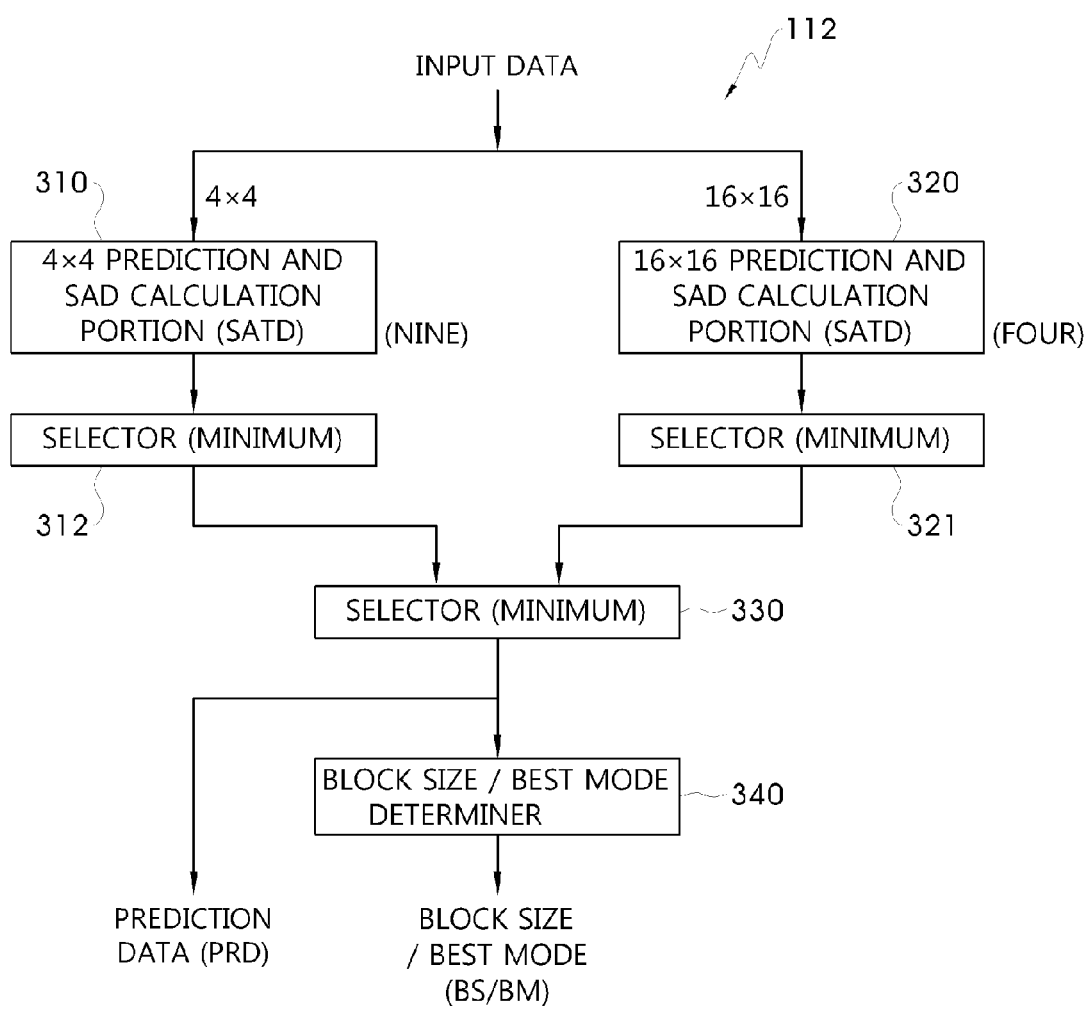
FIG. 3 is a block diagram illustrating a first prediction portion of the intra prediction unit shown in FIG. 1.
Figure 4:
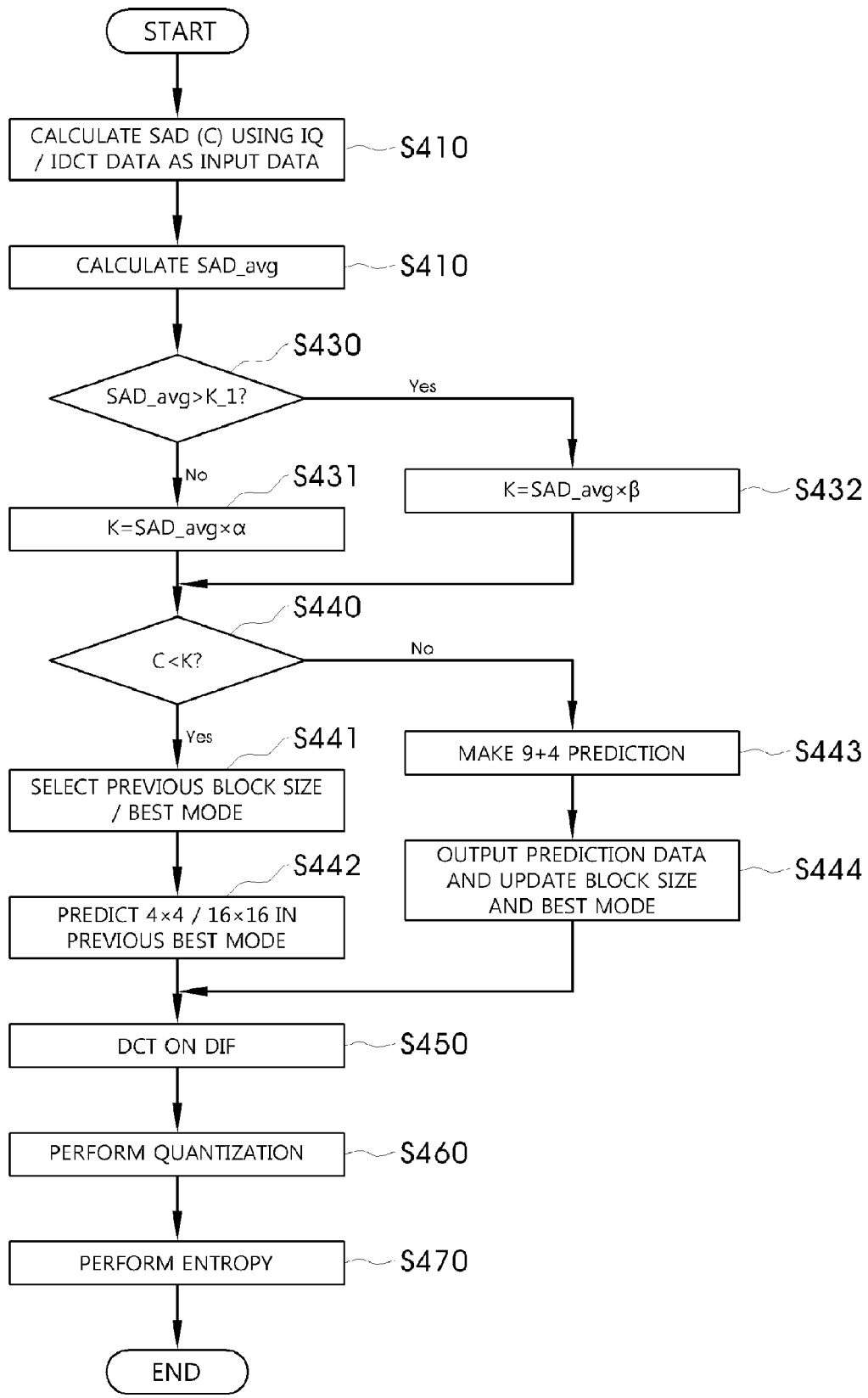
FIG. 4 is a flow diagram illustrating operations of a fast encoding system according to an embodiment of the invention.
Figure 6:
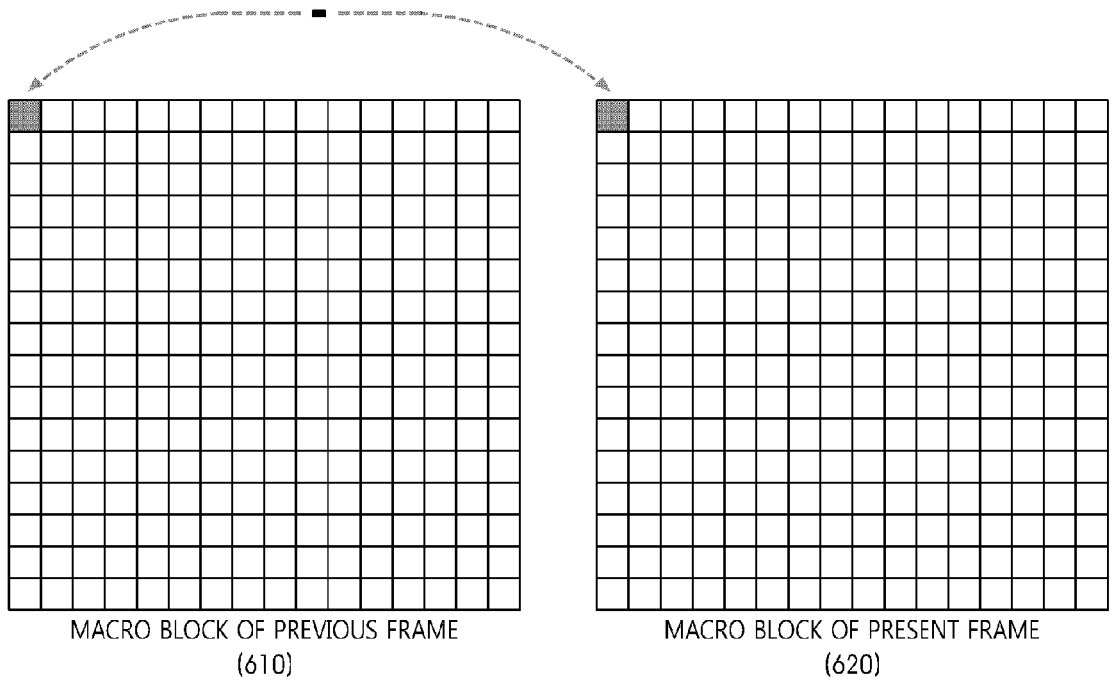
FIG. 6 is a diagram illustrating a method of calculating an SAD between the present frame and the previous frame.

The embodiment of the invention will be described in more detail with reference to FIGS. 2 and 3, where FIG. 2 is a block diagram illustrating a configuration of the reference value comparison unit 111 and FIG. 3 is a block diagram illustrating a configuration of the first prediction unit 111. FIGS. 4 and 6 may be further referred to for the purpose of explanation.

First, referring to FIG. 2, the reference value comparison unit 111 includes an SAD calculator 210, a frame buffer 211, a first SAD buffer 212, a second SAD buffer 213, an average calculator 220, a comparator 230, a first adjuster 231, a second adjuster 232, and a determiner 240.

The SAD calculator 210 calculates an SAD value C from the macro block data of the present frame, that is, the input macro block data IND, and the macro block data corresponding to the previous frame stored in the frame buffer 211 (S410 in FIG. 4). The frame buffer 211 updates and stores the image data of the previous frame every frame. The SAD calculator 210 reads the macro block data of the previous frame at the position corresponding to the macro block data of the present frame from the frame buffer 211. The SAD value C is the sum of absolute values of differences at like positions between the macro block data of the present frame (620 in FIG. 6) and the macro block data of the previous frame (610 in FIG. 6). The macro block data may be, for example, 16×16 block data as shown in FIG. 6. The SAD value C may be replaced with a value calculated by the SATD (Sum of Absolute Transformed Difference) scheme. The SATD means the sum of absolute values obtained by orthogonally transforming the difference values.

The SAD value C is stored in the first SAD buffer 212 and sent to the determiner 240. The second SAD buffer 213 receives the SAD value C from the first SAD buffer 212 every frame and updates and stores the SAD value calculated in the previous frame and the SAD value calculated in the pre-previous frame.

The average calculator 220 calculates an average value SAD_avg of the SAD values calculated in the previous frame and the pre-previous frame and stored in the second SAD buffer 213 (S420 in FIG. 4). Then, the comparator 230 compares the average value SAD_avg with a threshold value K_1 adaptively determined in advance and outputs the comparison result (S430 in FIG. 4). For example, when the average value SAD_avg is equal to or less than the threshold value K_1, the comparison result is in a first logical state (high logical state). In this case, the input image is determined as an image having a small variation between the previous frame and the present frame and the reference value K is raised using the average value SAD_avg and a first adjusting value $\alpha$ (S431 in FIG. 4). Alternatively, when the average value SAD_avg is greater than the threshold value K_1, the comparison result indicates a second logical state (low logical state). In this case, the input image is determined as an image having a great variation between the previous frame and the present frame and the reference value K is lowered using the average value SAD_avg and a second adjusting value $\beta$ (S432 in FIG. 4).

If $SAD\_avg \leq K\_1$, $K=SAD\_avg \times \alpha$

If $SAD\_avg \geq K\_1$, $K=SAD\_avg \times \beta$      Expression 1

Here, the threshold value K_1 is a reference value used to determine whether the input image is an image having a great variation and can be adaptively changed. When the average value SAD_avg is equal to or less than the threshold value K_1, it means that the input image is an image having a small variation between the previous frame and the pre-previous frame. On the contrary, when the average value SAD_avg is greater than the threshold value K_1, it means that the input image is an image having a great variation. If the variation between the previous frame and the pre-previous frame is small, it means that the variation between the present frame and the previous frame may be small. As a result, the reference value K is adaptively adjusted as described above depending on the temporal variation of the image. As for the image having a small variation, the reference value K is slightly raised to reduce the encoding time. As for the image having a great variation, the reference value K is slightly lowered to prevent the increase in bit rate.

The reference value K is determined in this way. Then, the determiner 240 determines the first prediction method of the first prediction unit 112 when the SAD value C is equal to or greater than the reference value K, and determines the second prediction method of the second prediction unit 114 when the SAD value C is smaller than the reference value K (S440 in FIG. 4).

Figure 5:
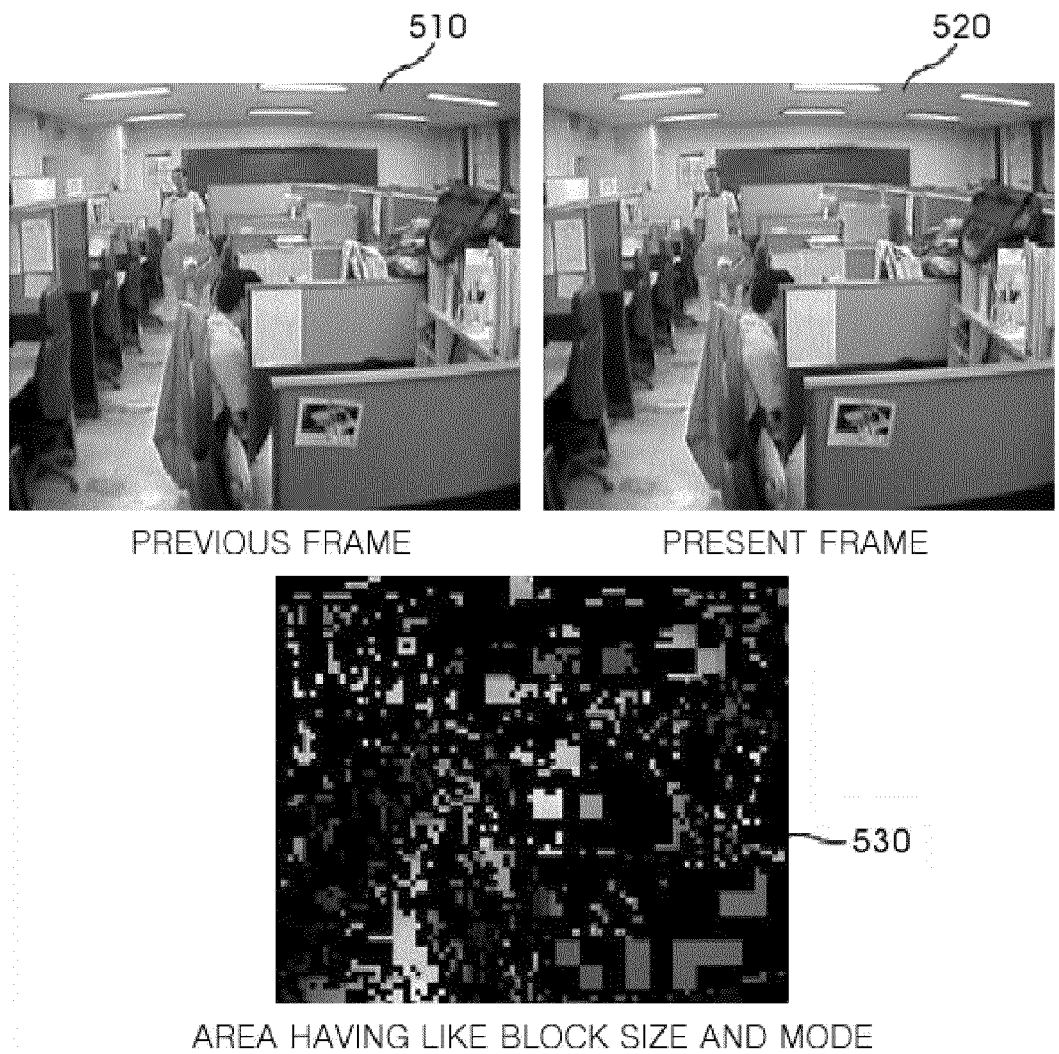
FIG. 5 is a diagram illustrating a correlation between the present frame and the previous frame.

For example, when the determiner 240 determines the second prediction method of the second prediction unit 114, the block size (4×4 or 16×16) and the best mode used in the previous frame can be used. The selector 115 allows the prediction on the macro block data of the present frame by determining whether the block size stored in the buffer 113 at the time of encoding in the previous frame is 4×4 or 16×16 to select the corresponding block size and selecting the corresponding best mode stored in the buffer 113. This process can greatly reduce the calculation quantity by allowing the first prediction unit 112 to adaptively skip the first prediction method of selecting the best mode BM and the block size BS from the nine prediction modes of 4×4 and the four prediction modes of 16×16 and to perform only one method such as the prediction method used in the previous frame. For example, in a general security image shown in FIG. 5, the variation in background and environment is small between the image 510 of the previous frame and the image 520 of the present image and the area 530 having a like prediction mode (for example, the best mode) and a like macro block size occupies most of one picture. The area marked by black in FIG. 5 indicates an area in which the same macro block size and the same prediction mode are used in the previous frame and the present frame. Accordingly, this embodiment is more excellent in image quality, processing time, and bit rate than the known intra-prediction fast algorithm and is suitable for the images such as a security image having a small variation in background and environment.

For example, in FIG. 1, the selector 115 can select a prediction path for the first prediction unit 116 or the second prediction unit 117 on the basis of the best mode BM and the block size BS finally stored in the buffer 113 (S441 in FIG. 4). When a first path is selected as the prediction path, the first prediction unit 116 makes a prediction on the data on the basis of one of the nine directional prediction modes for 4×4 block data and the corresponding block size as the best mode BM and the block size BS used in the previous frame and generates the prediction data PRD (S442 in FIG. 4). Alternatively, when a second path is selected as the prediction path by the selector 115, the second prediction unit 117 makes a prediction on the data on the basis of one of the four directional prediction modes for 16×16 block data and the corresponding block size as the best mode BM and the block size BS used in the previous frame and generates the prediction data PRD (S442 in FIG. 4).

On the other hand, when the first prediction method of the first prediction unit 112 is determined by the determiner 240, that is, when the SAD value C is equal to or greater than the reference value K, the image may have a great variation and may have a different block size and a different best mode. Accordingly, in this case, the entire retrieval method similar to the known method is used instead of the second prediction method. At this time, the block size BS and the best mode BM determined in the present frame are stored in the buffer 113 for use in the subsequent frame.

FIG. 3 shows a specific configuration of the first prediction unit 112 of the intra prediction device 110. Referring to FIG. 3, the first prediction unit 112 includes a 4×4 prediction and SAD calculation portion 310, a first selector 312, a 16×16 prediction and SAD calculation portion 320, a second selector 321, a third selector 330, and a block size and best mode determiner 340.

The 4×4 prediction and SAD calculation portion 310 makes a spatial prediction on 4×4 block data of the input macro block data IND in the nine directional prediction modes and calculates the SAD values of the prediction result (S443 in FIG. 4). In the intra 4×4 mode prediction method, a prediction is made on the 4×4 block data to be encoded using neighboring pixel values neighboring in nine directions, that is, in directions of Vertical (0), Horizontal (1), DC (2), Diagonal_Down_Left (3), Diagonal_Down_Right (4), Vertical_Right (5), Horizontal_Down (6), Vertical_Left (7), and Horizontal_Up (8), in interpolation. The 4×4 prediction and SAD calculation portion 310 generates the SAD values (or SATD) of the prediction result. Accordingly, the first selector 312 selects the minimum value MIN1 from the SAD values calculated by the 4×4 prediction and SAD calculation portion 310.

The 16×16 prediction and SAD calculation portion 320 makes a spatial prediction on 16×16 block data of the input macro block data IND in the four directional prediction modes and calculates the SAD values of the prediction result (S443 in FIG. 4). In the intra 16×16 mode prediction method, a prediction is made on the 16×16 block data to be encoded using neighboring pixel values neighboring in four directions, that is, in directions of Vertical, Horizontal, DC, and Plane, in interpolation. The 16×16 prediction and SAD calculation portion 320 generates the SAD values (or SATD) of the prediction result. Accordingly, the second selector 321 selects the minimum value MIN2 from the SAD values calculated by the 16×16 prediction and SAD calculation portion 320.

The third selector 330 selects the smaller minimum value of the minimum value MIN1 and the minimum value MIN2 and output the prediction data PRD predicted in the mode corresponding to the selected minimum value, that is, in the best mode BM. The block size and best mode determiner 340 determines the mode corresponding to the minimum value selected by the third selector 330 as the best mode BM and stores the best mode BM and the block size BS of the best mode in the buffer 113 (S444 in FIG. 4).

The prediction data PRD generated by the intra prediction device 110 is fed back to the subtracter 120. In this way, the process of allowing the DCT unit 130 to perform a DCT on the difference value DIF (S450 in FIG. 4), the process of allowing the quantization unit 140 to quantize the DCT result of the DCT unit 130 (S460 in FIG. 4), and the process of allowing the entropy encoding unit 160 to entropy-encode the quantization result (S470 in FIG. 4) are repeated, and the result obtained by allowing the inverse quantization and inverse DCT unit 150 to perform an inverse quantization and an inverse DCT on the quantization result of the quantization unit 140 is input again as the input macro block data IND to the intra prediction device 110.

As described above, the fast encoding method and system using adaptive intra prediction can be applied to the H.264/AVC which is the newest compression scheme to improve the performance and the reduce the complexity. Accordingly, it is possible to greatly contribute to video application fields for the multimedia image processing in security systems and various network environments as a source technology. It will be understood by those skilled in the art, as being implicit in the terminology and context of the description above, that the method and system disclosed herein are realized in a computer processor, which performs the method described and includes the components described.

While the invention has been described with reference to the embodiments and the drawings, the invention is not limited to the embodiments and can be modified in various forms by those skilled in the art. The scope of the invention is not limited to the above-mentioned embodiments, but should be defined by the appended claims and equivalents thereof.

What is claimed is:

1. An intra prediction method of compressing and encoding an image by a computer processor, the method comprising the steps of:
   comparing an SAD value C calculated from macro block data of a present frame and a previous frame with a reference value K and determining a prediction method; and
   selectively performing on input macro block data a first method of determining a best mode and a block size by prediction in a plurality of prediction modes based on spatial directivity and generating prediction data and a second method of generating prediction data using the best mode and the block size used in the previous frame, depending on the determined prediction method;
   wherein the step of determining the prediction method includes:
   calculating an average value SAD_avg of the SAD values calculated from the previous frame and a pre-previous frame; and
   comparing the average value with a threshold value K_1 adaptively determined in advance and adjusting the reference value K in accordance with the comparison result; and
   wherein the step of adjusting the reference value includes:
   raising the reference value by determining that the image has a small variation between the previous frame and the present frame when the average value is equal to or less than the threshold value; and
   lowering the reference value by determining that the image has a great variation between the previous frame and the present frame when the average value is greater than the threshold value.

2. The intra prediction method according to claim 1, wherein in the step of determining the prediction method, the prediction method is selected by determining a variation in temporal correlation between an image of the present frame and an image of the previous frame on the basis of the comparison result of the SAD value C calculated from macro block data of the present frame and the previous frame with the reference value K, so as to select one of the first method of spatially predicting an image having a small correlation and the second method of predicting an image having a greater correlation than that of the first method by the use of the best mode and the block size used in the previous frame.

3. The intra prediction method according to claim 1, wherein the step of calculating the average value uses 16×16 block data as the macro block data.

4. The intra prediction method according to claim 1, wherein the first method includes:
   selecting a minimum value MIN1 of the SAD values resulting from the spatial prediction on 4×4 block data in nine directivity prediction modes and a minimum value MIN2 of the SAD values resulting from the spatial prediction on 16×16 block data in four directivity prediction modes;
   selecting the smaller value of the minimum value MIN1 and the minimum value MIN2 and determining the mode to which the selected minimum value belongs as the best mode; and
   storing the best mode and the block size of the best mode in a predetermined storage and outputting prediction data predicted in the best mode.

5. The intra prediction method according to claim 1, wherein the second method includes:
   when the best mode and the block size used in the previous frame are one of the nine directional prediction modes and the corresponding block size for the 4×4 block data, respectively, making a prediction on data having the corresponding block size in the corresponding mode; and
   when the best mode and the block size used in the previous frame are one of the four directional prediction modes and the corresponding block size for the 16×16 block data, respectively, making a prediction on data having the corresponding block size in the corresponding mode.

6. An intra prediction device realized in a computer processor for compressing and encoding an image, the intra prediction device comprising:
   a reference value comparison unit determining a prediction method by comparing an SAD value C calculated from macro block data of a present frame and a previous frame with a reference value K;
   a first prediction unit determining a best mode and a block size by making a prediction on input macro block data in a plurality of prediction modes based on spatial directivity and generating prediction data when a first method is determined as the prediction method;
   a buffer storing the best mode and the block size; and
   a second prediction unit generating prediction data for the input macro block using the best mode and the block size used in the previous frame and stored in the buffer when a second method is determined as the prediction method,
   wherein the reference value comparison unit includes:
   a first calculator calculating SAD values from macro block data of the present frame and the previous frame;
   a second calculator calculating an average value SAD_avg of SAD values acquired from the previous frame and a pre-previous frame;
   a comparator comparing the average value with a threshold value K_1 adaptively determined in advance;
   a first adjuster raising the reference value K on the basis of the average value and a first adjusting value when the comparison result is in a first logical state;
   a second adjuster lowering the reference value K on the basis of the average value and a second adjusting value when the comparison result is in a second logical state; and
   a determiner determining one of the first method and the second method on the basis of the comparison result of the SAD values C and the reference value K.

7. The intra prediction device according to claim 6, wherein the first prediction unit
   selects a minimum value MIN1 of the SAD values resulting from the spatial prediction on 4×4 block data in nine directivity prediction modes and a minimum value MIN2 of the SAD values resulting from the spatial prediction on 16×16 block data in four directivity prediction modes,
   selects the smaller value of the minimum value MIN1 and the minimum value MIN2 and determines the mode to which the selected value belongs as the best mode, and
   stores the best mode and the block size of the best mode in the buffer and outputs prediction data predicted in the best mode.

8. The intra prediction device according to claim 6, wherein the second prediction unit includes:
   a selector selecting a prediction path on the basis of the best mode and the block size stored in the buffer;
   a first predictor making a prediction on data having the corresponding block size in the corresponding mode using one of the nine directional prediction modes and the corresponding block size for the 4×4 block data as the best mode and the block size used in the previous frame, respectively, when a first path is selected as the prediction path; and a second predictor making a prediction on data having the corresponding block size in the corresponding mode using one of the four directional prediction modes and the corresponding block size for the 16×16 block data as the best mode and the block size used in the previous frame, respectively, when a second path is selected as the prediction path.

* * * * *